(12) United States Patent
Shigeta

(10) Patent No.: US 8,311,566 B2
(45) Date of Patent: Nov. 13, 2012

(54) COMMUNICATION APPARATUS, SERVER APPARATUS, AND COMMUNICATION CONTROL METHOD

(75) Inventor: Saya Shigeta, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 777 days.

(21) Appl. No.: 12/159,597

(22) PCT Filed: Dec. 27, 2006

(86) PCT No.: PCT/JP2006/326055
§ 371 (c)(1),
(2), (4) Date: Jul. 28, 2009

(87) PCT Pub. No.: WO2007/077873
PCT Pub. Date: Jul. 12, 2007

(65) Prior Publication Data
US 2009/0298444 A1 Dec. 3, 2009

(30) Foreign Application Priority Data
Dec. 27, 2005 (JP) .................................. 2005-375603

(51) Int. Cl.
*H04B 7/00* (2006.01)
*H04M 3/42* (2006.01)
(52) U.S. Cl. ......... 455/519; 455/518; 455/517; 455/416
(58) Field of Classification Search .................. 455/517, 455/518, 519, 416
See application file for complete search history.

(56) References Cited

U.S. PATENT DOCUMENTS

| 6,434,402 | B1 * | 8/2002 | Davison et al. ............... 455/555 |
| 6,608,820 | B1 * | 8/2003 | Bradshaw, Jr. ................. 370/260 |
| 6,650,908 | B1 * | 11/2003 | Coombes et al. ............. 455/560 |
| 6,792,281 | B2 * | 9/2004 | Upp et al. ...................... 455/519 |
| 7,203,509 | B2 * | 4/2007 | Gottschalk et al. ........... 455/518 |
| 7,483,708 | B2 * | 1/2009 | Maggenti ...................... 455/518 |
| 7,577,455 | B2 * | 8/2009 | Szymanski et al. ........... 455/519 |
| 7,747,270 | B2 * | 6/2010 | Schwagmann et al. ....... 455/519 |
| 7,751,806 | B1 * | 7/2010 | Vu ................................ 455/418 |
| 7,885,675 | B2 * | 2/2011 | Wu et al. ....................... 455/519 |
| 7,966,030 | B2 * | 6/2011 | Yamaguchi ................... 455/518 |
| 2003/0050078 | A1 * | 3/2003 | Motegi et al. ................. 455/456 |
| 2003/0119540 | A1 * | 6/2003 | Mathis .......................... 455/518 |

FOREIGN PATENT DOCUMENTS

| JP | 08-032949 | 2/1996 |
| JP | 2003-174520 | 6/2003 |
| JP | 2005-522067 | 7/2005 |

OTHER PUBLICATIONS

Extended European search report dated Mar. 19, 2012 issued in corresponding European application 06843437.2.

* cited by examiner

*Primary Examiner* — Tilahun B Gesesse
(74) *Attorney, Agent, or Firm* — DLA Piper LLP (US)

(57) ABSTRACT

A communication apparatus capable of reporting that there is group communication for which a start notice has been received, but no response has been sent and facilitating checking of whether the group communication is in progress and its communication control method is provided. When a communication unit receives a start notice of PTT (push to talk) communication, an operation reporting the reception of the start notice is performed. If no instruction to participate in the PTT communication is input from a key input unit with respect to this report operation, a message indicating that the PTT communication is in progress is displayed on the display unit until an end notice of PTT communication is received at the communication unit.

15 Claims, 9 Drawing Sheets

FIG. 10A

<MISSED CALL LIST>

| MISSED CALL | STATE |
|---|---|
| 1 | IN PROGRESS |
| 2 | END |
| 3 | END |
| 4 | IN PROGRESS |

<DISPLAY MESSAGE>

THERE IS PTT COMMUNICATION IN PROGRESS

IN PROGRESS:2
END:2

↓ RECEIVE END REPORT OF "MISSED CALL 4"

FIG. 10B

<MISSED CALL LIST>

| MISSED CALL | STATE |
|---|---|
| 1 | IN PROGRESS |
| 2 | END |
| 3 | END |
| 4 | END |

<DISPLAY MESSAGE>

THERE IS PTT COMMUNICATION IN PROGRESS

IN PROGRESS:1
END:3

↓ CHECK HISTORY OF "MISSED CALL 1"

FIG. 10C

<MISSED CALL LIST>

| MISSED CALL | STATE |
|---|---|
| 2 | END |
| 3 | END |
| 4 | END |

<DISPLAY MESSAGE>

THERE IS PTT COMMUNICATION

IN PROGRESS:0
END:3

COMMUNICATION APPARATUS, SERVER APPARATUS, AND COMMUNICATION CONTROL METHOD

CROSS REFERENCE TO RELATED APPLICATION

This application is a national stage of International Application No. PCT/JP2006/326055 filed on Dec. 27, 2006, and claims the benefit of priority under 35 USC 119 of Japanese Patent Application No. 2005-375603 filed on Dec. 27, 2005 which are incorporated herein by reference.

TECHNICAL FIELD

The present invention relates to a communication apparatus engaging in PTT (Push To Talk) or other group communication and a communication control method of the same and a server apparatus managing the group communication. More particularly, the present invention relates to a communication apparatus provided with a function of reporting the existence of an unanswered call in a case where a call signal is not answered.

BACKGROUND ART

In general, a mobile phone has a function of reporting to a user the existence of an unanswered call ("missed call") where a call signal has not been answered even when arriving. For example, the missed call is reported by displaying as "missed call" or another message near the center of a standby screen, by displaying that there was a missed call by using a graphic referred to as a "pict" in a top or bottom dedicated area of the screen, or by turning on an LED or other light emitting element.

Further, also in a case where not only arrival of a call, but also arrival of an e-mail (arrival of new mail) occurs, the arrival of the e-mail is reported to the user by a method similar to that in the case of the call.

The display of such a missed call is usually erased by a user performing a predetermined check operation. For example, in the case of a call, the display is erased by displaying a screen of the incoming call history. While in the case of an e-mail, the display is erased by receiving new mail from a server and displaying that received mail on the screen. Even if the user performs a different operation from this, the display of the missed call is not erased.

Further, in many mobile phones, together with messages of missed calls, buttons for directly shifting to screens for the incoming call history and mail reception are displayed as soft keys. If the user depresses a button corresponding to this display to shift to such a screen, the message of the missed call is erased from the standby screen.

In recent years, the modes of communication by phones have been diversifying. In addition to conventional voice calls by line switching, phones capable of performing packet communication utilizing an IP (Internet Protocol) network are being widely utilized. For example, there is known "chat mail" where mobile phones engage in conversations by trading text in real time (see Patent Document 1). Chat mail is one of the modes of communication called "group communication" where preregistered members form a group and trade text or other data in real time in the group.

Further, as one of the modes of group communication attracting attention recently, there is the one called PTT (push to talk) or PoC (push to talk over cellular). In PTT, a plurality of communication apparatuses forming a group engage in voice calls in real time by VoIP (Voice over Internet Protocol) (see Patent Document 2).

In group communication of PTT, a user desiring to say something pushes a predetermined button (PTT button) provided at the communication apparatus, whereby a speak request of the user is sent to the server apparatus. The server apparatus receives speak requests from the different communication apparatuses and gives a right of speech to one communication apparatus. The communication apparatus given the right of speech transmits audio data of the user to the server apparatus. Then, the server apparatus transmits the voice data to the other communication apparatuses all together. Due to this, a plurality of communication apparatuses forming a group engage in a voice call in real time.

Patent Document 1: Japanese Patent Publication (A) No. 2003-174520
Patent Document 2: Japanese Patent Publication (A) No. 2005-522067

DISCLOSURE OF THE INVENTION

Problem to be Solved by the Invention

In general, a mobile phone engaged in PTT communication executes the processing which relates to the PTT communication by application program for the PTT communication. This application program is started up manually by instruction of the user. Also, this application program is automatically started up when there is an incoming call of PTT (reception of notification of holding PTT communication by an e-mail etc.)

When automatically started up in response to an incoming call, the application program for PTT communication uses a report sound etc. to reports the incoming call of PTT to the user. At this time, if the user inputs an instruction to participate (join) in the PTT communication by operation of a speech button or the like, the application program performs the followings: transmission of a response indicating participation in the PTT communication to the server apparatus, and start of the PTT communication. On the other hand, when no instruction of the user is input for a certain time or more, the application program autonomously ends without transmitting a participation response.

In a case where there is an unanswered incoming call of PTT communication as described above (missed call of PTT), in the same way as the case of a call or e-mail, desirably the existence of that missed call is displayed on the standby screen etc. to inform it to the user.

Unlike usual one-to-one communication, group communication is held even if one communication apparatus does not respond to the incoming call so long as the other communication apparatuses respond to the incoming call. Even when a user checks the display of the missed call, if that group communication is in progress, it is possible to participate in this in the middle.

However, the user cannot judge whether or not that PTT communication is in progress at present by just simply the display of the fact that a missed call of PTT occurred. Namely, when the user tries to engage in a communication operation in order to participate in the PTT communication on the middle but fails in connection, then the user can learn that the PTT communication has ended. For this reason, there is an inconvenience that the communication operation in order to participate in the PTT communication of the missed call in the middle becomes wasted.

In consideration of the above-explained circumstances, it has been desired to provide a communication apparatus capable of reporting that there is group communication for which a start notice has been received, but no response has been sent, and facilitating checking of whether the group communication is in progress. Also, it has been desired to provide its communication control method and a server apparatus managing group communication performed by such communication apparatuses.

Means for Solving the Problem

A communication apparatus of the present invention has a communication unit configured to perform group communication, an input unit configured to input an instruction, a report unit, and a control unit configured to make the communication unit perform the group communication if the communication unit receives a start notice of group communication and an instruction of participation in the group communication is input from the input unit. In this communication apparatus, if the communication unit receives the start notice of group communication, the control unit makes the report unit report the reception of the start notice and, if a participation instruction is not input from the input unit with respect to the report, makes the report unit report that the group communication is in progress until the group communication ends.

Preferably, the control unit judges that the group communication relating to an end notice has ended based on the communication unit receiving an end notice of group communication.

Further preferably, no participation instruction is input in a predetermined time from the time where the report unit reported the reception of the start notice, then, the control unit makes the report unit report, in place of the report of the reception of the start notice, a report indicating that the participation instruction has not been input although the communication apparatus has received the start notice.

Further, the report unit is reporting that group communication relating to the start notice is in progress, then, the control unit may make the report unit report the end of the group communication if the communication unit receives the end notice of the group communication.

Further, when the report unit is reporting that the group communication relating to the start notice is in progress, then, the control unit may make the communication unit engage in the group communication if an instruction of midway participation in the group communication is input from the input unit.

Trying to start group communication in response to a midway participation instruction with respect to group communication being reported by the report unit and the group communication cannot be started since the communication condition of the communication unit is poor, then, the control unit may make the report unit report that the group communication cannot be started due to a poor communication condition.

Trying to start group communication in response to a midway participation instruction with respect to group communication being reported by the report unit and the group communication cannot be started since the group communication has already ended, then, the control unit may make the report unit stop the reporting which shows that the group communication is in progress.

The end notice of the group communication has not been received for a predetermined time or more from when making the report unit report that the group communication relating to the start notice is in progress, then, the control unit may stop the reporting by the report unit which shows that the group communication is in progress.

If there is a plurality of group communications for which start notices have been received, but participation instructions from the input unit have not been input and the plurality of group communications include group communications which have not yet ended, then, the control unit may make the report unit report that there are group communications in progress for which start notices have been received, but participation instructions have not been input.

The communication apparatus may further have a storage unit configured to store a list linking the start notices received by the communication unit and the states of the group communications corresponding to the start notices. The control unit may register the state of the group communication corresponding to the received start notice in the list as a first state when no participation instruction is input at the input unit in a predetermined time from when the communication unit received the start notice. The control unit may change the state of the group communication corresponding to an end notice in the list to a second state and if the communication unit receives an end notice of the group communication. The control unit may make the report unit report that the group communication in progress is included in group communications corresponding to start notices when at least one group communication in the first state is registered in the list.

If at least one group communication in the second state is registered in the list, the control unit may make the report unit report that group communication which has ended is included among the group communications corresponding to the start notice.

The control unit may make the report unit report at least one of a number of group communications in the first state included in the list and a number of group communications in the second state included in the list.

A server apparatus of the present invention engages in communication with a plurality of communication apparatuses including the communication apparatus explained above and manages the group communication. This server apparatus transmits a start notice of group communication to a communication apparatus designated as another party when the other party is designated from one of the communication apparatuses and the start of group communication is requested. And this server apparatus allows the communication apparatus which has requested the start and a communication apparatus which has answered engage in group communication therebetween if there is a response of participation from any communication apparatus which has transmitted a start notice. This server apparatus transmits an end notice with respect to the communication apparatus of the designated other party when the group communication in progress is to be ended.

A communication apparatus of the present invention has a communicating means configured to engage in group communication, an inputting means configured to input an instruction, and a reporting means. The communication apparatus has a group communication controlling means configured to make the communication unit engage in group communication if the communication unit has received a start notice of group communication and received as input an instruction of participation in group communication from the input unit in a predetermined time. The communication apparatus has a report controlling means configured to make said report unit report the reception of the start notice when the communication unit has received the start notice of the group communication and make the report unit report that the group communication is in progress during a period until the communication unit receives the end notice of the group communication when no participation instruction is input from the input unit in a predetermined time.

A communication control method of the present invention is a communication control method operating in the communication apparatus having a communication unit, an instruction input unit, and a report unit and engaging in group communication by the communication unit if an instruction of participation in group communication is input from the instruction input unit when the communication unit receives a start notice of group communication. The communication control method includes the steps of: reporting by the report unit the reception of a start notice when a start notice of group communication is received; and reporting by the report unit that group communication is in progress during a period until the communication unit receives an end notice of group communication when no participation instruction is input from the input unit with respect to the report.

EFFECT OF THE INVENTION

According to the present invention, it can be reported that there is group communication for which a start notice has been received, but no response has been sent and checking of whether or not the group communication is in progress becomes easy.

BRIEF DESCRIPTION OF THE DRAWINGS

FIG. 10 A diagram showing another example of the display of a missed call report.

DESCRIPTION OF NOTATIONS

101 . . . antenna, 102 . . . communication unit, 103 . . . key input unit, 104 . . . audio processing unit, 105 . . . speaker, 106 . . . microphone, 107 . . . display unit, 108 . . . storage unit, 110 . . . control unit, 111 . . . group communication control unit, 112 . . . report control unit, 100, 100-1 to 100-5 . . . communication terminals, 200 . . . communication management device, and 300 . . . communication network.

BEST MODE FOR CARRYING OUT THE INVENTION

Figure 1:
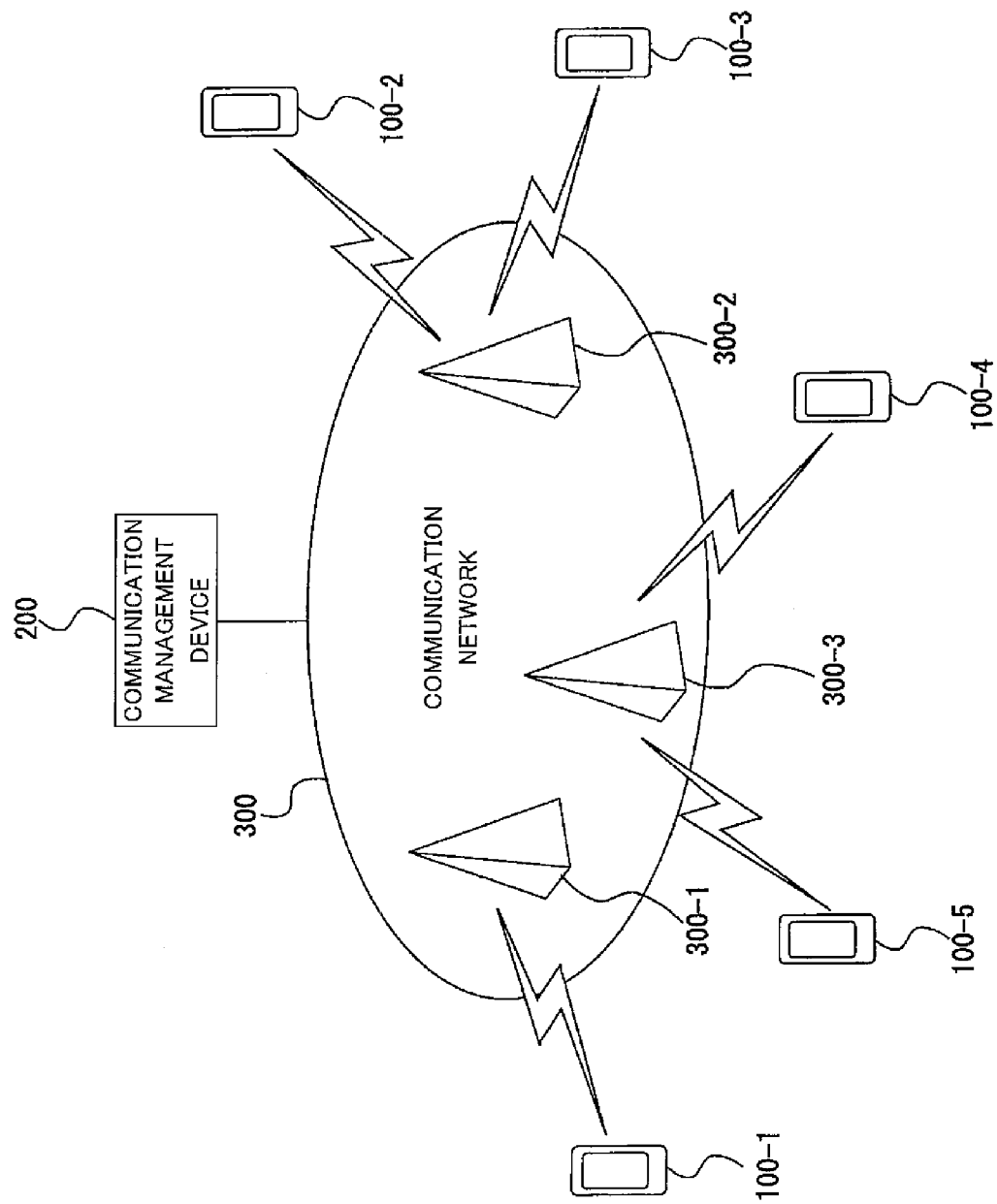
FIG. 1 A diagram showing an example of the configuration of a communication system according to an embodiment of the present invention.

FIG. 1 is a diagram showing an example of the configuration of a communication system according to an embodiment of the present invention.

The communication system according to the present embodiment, for example, as shown in FIG. 1, has communication apparatuses 100-1 to 100-5 and a communication management device 200.

A communication apparatus 100-$i$ (i indicates an integer from 1 to 5) is, for example, a mobile phone or other wireless communication terminal connected to a communication network 300 via a base station (300-1, 300-2, 300-3). Further, the communication apparatus 100-$i$ engages in data communication under the control of the communication management device 200 connected to the communication network 300. In the present embodiment, it is assumed that group communication by PTT (push to talk) (hereinafter sometimes called "PTT communication") is carried out as an example. Data transmitted in the PTT communication includes, for example, speech voice, images, text, music, and other data.

When the communication apparatus engages in PTT communication, the communication apparatus 100-$i$ becomes the device of the sponsor starting the PTT communication (hereinafter sometimes called as the "sponsor terminal") or become a device participating in the PTT communication upon receipt of an opening report of PTT communication (hereinafter sometimes called as "a participant terminal").

When itself becoming the sponsor terminal and starting the PTT communication, first, the communication apparatus 100-$i$ accesses the communication management device 200, designates a plurality of other parties selected from an address book etc. stored in its own storage unit, and requests the start of the PTT communication. The communication management device 200 receiving this request establishes a site for the PTT communication management as will be explained later. Then the communication apparatus 100-$i$ acquires a network address of the established site, log-in use ID, and other information from the communication management device 200.

On the other hand, when receiving a start notice of PTT communication sent from the communication management device 200, the communication apparatus 100-I reports that a start notice has been received to the user by the report unit generating, for example, an image, light, sound, or vibration. At the time of this reporting, if an instruction of participation in the PTT communication is input by, for example, a key operation of the user, the communication apparatus 100-$i$ transmits a response indicating the participation in the PTT communication to the communication management device 200. The communication apparatus further accesses the site for the communication management based on the information included in the start notice, and starts the PTT communication as a participant terminal.

The communication management device 200 manages the group communication of PTT performed by the communication apparatuses (100-1 to 100-5).

When receiving a start request of PTT communication issued by the sponsor terminal, the communication management device 200 establishes a site for PTT communication management on the communication management device 200 (or another server apparatus on the network). This site manages information of communication apparatuses. Such the information contains participating in the PTT communication (call numbers, e-mail addresses, etc.), participation and departure in/from the PTT communication of each communication apparatus, transmission/reception of data between communication apparatuses, giving of a right of speech to the communication apparatus requesting to speak, and other various managements and controls concerning the PTT communication.

When establishing a site for PTT communication management in response to a start request of PTT communication, the communication management device 200 transmits the information of that site to the sponsor terminal. At the same time, the communication management device 200 transmits a start notice of PTT communication to each of the participant terminals designated in the start request of PTT communication. The start notice of PTT communication includes various information required for participating in PTT communication. Such the various information contains, for example, the information of the sponsor terminal of the PTT communication (call number, e-mail address, etc.), the network address of the PTT communication management use site explained above, and the log-in use ID.

When transmitting the start notice of the PTT communication to the participant terminals, the communication management device 200 monitors responses from the participant terminals with respect to this start notice. When receiving a response indicating participation in PTT communication from at least one participant terminal, the communication management device 200 manages and controls the PTT communication carried out by this participant terminal and the sponsor terminal.

If a speak request (data transmission request) is issued by, for example, depression of the PTT button in one communication apparatus participating in the PTT communication, the communication management device 200 gives the right of speech (data transmission right) to this one communication apparatus if there is no other communication apparatus in the middle of speaking (in the middle of data transmission). Namely, the communication management device 200 receives the data (speech voice, text, etc.) sent from this one communication apparatus and transmits this to the participating communication apparatuses. If there is another communication apparatus in the middle of speaking, the communication management device 200 returns a response of rejection to this one communication apparatus. When speak requests of several communication apparatuses overlap, a priority order of each communication apparatus is determined according to a predetermined rule (for example, the smaller the number of times of speaking of the terminal, the higher the order), and the right of speech is given to communication apparatuses in an order based on this.

When receiving an end request of PTT communication issued by the sponsor terminal, the communication management device 200 transmits the end notice of PTT communication to the participant terminals and ends the PTT communication. In this case, the communication management device 200 transmits the end notice to not only the communication apparatuses participating in the PTT communication, but also communication apparatuses not participating which did not return participation responses to the start notice of PTT communication.

Next, an example of the configuration of the communication apparatus will be explained.

Figure 2:
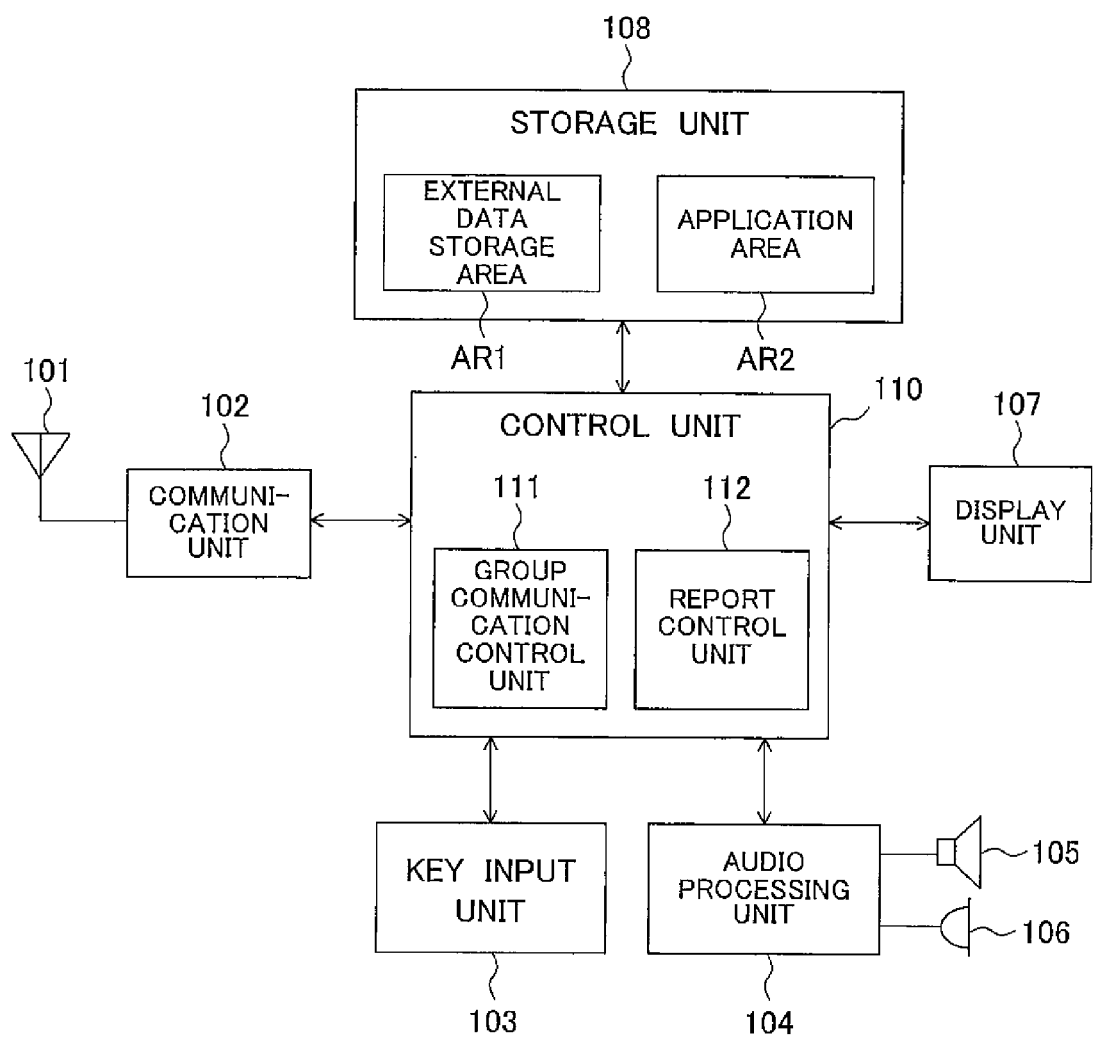
FIG. 2 A diagram showing an example of the configuration of a communication apparatus according to an embodiment of the present invention.

FIG. 2 is the diagram showing an example of the configuration of communication apparatuses (100-1 to 100-5) according to an embodiment of the present invention. In the following description, communication apparatuses having the configuration shown in FIG. 2 will be sometimes called the "communication apparatus 100" all together.

The communication apparatus 100 shown in FIG. 2 has an antenna 101, communication unit 102, key input unit 103, audio processing unit 104, speaker 105, microphone 106, display unit 107, storage unit 108, and control unit 110.

The communication unit 102 engages in wireless communication with base stations (300-1, 300-2, 300-3) connected to the communication network 300. For example, the communication unit 102 applies a predetermined modulation processing to the transmission data supplied from the control unit 110 to convert this to a wireless signal, and transmits the modulated signal from the antenna 101. Further, the communication unit 102 applies a predetermined demodulation processing to a wireless signal from the base station received at the antenna 101 to convert this to reception data and outputs the modulated signal to the control unit 110.

The key input unit 103 has keys to which various functions are assigned, for example, a power key, speech key, numerical keys, letter keys, direction keys, an execute key, and a PTT button. When these keys are operated by the user, the unit generates a signal corresponding to the operation content and inputs this as an instruction of the user to the control unit 110.

The audio processing unit 104 processes the audio signal output at the speaker 105 and the audio signal input at the microphone 106. Namely, the audio processing unit applies amplification, analog-to-digital conversion, encoding, or other signal processing to the audio signal input from the microphone 106, converts this to digital audio data, and outputs the converted result to the control unit 110. Further, audio processing unit applies decoding, digital-to-analog conversion, amplification, or other signal processing to the audio data supplied from the control unit 110, converts this to an analog audio signal, and outputs the result to the speaker 105.

The display unit 107 is configured using a liquid crystal display panel or organic EL panel or other display device and displays an image in accordance with a video signal supplied from the control unit 110. For example, the display unit displays a call number of a destination at the time of making a call, a call number of the other party at the time of an incoming call, contents of received mail and transmitted mail, date, time, remaining battery life, standby screen, and other various information and images.

The storage unit 108 stores various data utilized in the processing at the control unit 110. For example, the storage unit holds a computer program provided in the control unit 110, an address book managing the telephone numbers, e-mail addresses, and other personal information of the other parties of the communication, an audio file for reproducing an incoming call sound and an alarm sound, various setting data, temporary data utilized in a processing step of the program, and so on.

The storage unit 108 has an external data storage area AR1 for which access of any program is allowed and an application area AR2 for which access of specific application programs is allowed. For example, an application program executing processing relating to PTT communication stores the incoming call history and other data which must be stored even after the end of the program in a dedicated region in the application area AR2.

The storage unit 108 is configured by, for example, a nonvolatile storage device (nonvolatile semiconductor memory, hard disc device, optical disc device, etc.) or a randomly accessible storage device (for example an SRAM or DRAM).

The control unit 110 centrally controls the entire operation of the communication apparatus 100. Namely, the control unit controls the operations of the units explained above (transmission/reception of signals at the communication unit 102, input/output of audio in the audio processing unit 104, display of images in the display unit 107, etc.). As a result, so that various processings of the communication apparatus 100 (voice speech, group communication of PTT, preparation and transmission/reception of e-mails, viewing of web sites of the Internet, and so on which are carried out via a line switching network) are executed in a suitable sequence in accordance with the operation of the key input unit 103.

For example, the control unit 110 is provided with a computer executing processing based on programs (operating system, applications, etc.) stored in the storage unit 108 and executes the processing explained above according to the sequence indicated by the programs.

The control unit 110 performs the following processing related to the PTT communication.

If a start notice of PTT communication is received at the communication unit 102, the control unit 110 automatically starts up the PTT application and controls the display unit 107 and speaker 105 so as to report that a PTT call has arrived in this started up PTT application. For example, by making the display unit 107 display a message informing the reception of an incoming call of PTT on its screen or making the speaker 105 generate a sound, the control unit 110 reports that a start notice of PTT communication has been received.

Further, when making the above described report, the control unit 110 monitors whether a predetermined key operation indicating participation in the PTT communication (for example depression of the speech key) was carried out at the key input unit 103.

When an instruction of participation in the PTT communication is input to the key input unit 103, the control unit 110 executes the start processing of the PTT communication by the communication unit 102. Namely, the control unit 110 transmits a response indicating the participation in the PTT communication from the communication unit 102 to the communication management device 200, accesses the site established by the communication management device 200 based on the information included in the received start notice, and starts the PTT communication.

When no participation instruction has been input in a predetermined time, the control unit 110 ends the PTT application without transmitting a participation response to the communication management device 200. Further, at that time, the control unit 110 stores data indicating that the start notice of the PTT communication has not been answered (that is, a missed call of PTT occurred) in the external data storage area AR1 of the storage unit 108. In this way, hereinafter, PTT communication for which a start notice has been received, but for which no participation instruction has been input at the key input unit 103 will be called "unanswered PTT communication".

The control unit 110 stores the state of unanswered PTT communication in the external data storage area AR1 of the storage unit 108 in, for example, a list format.

Namely, the control unit 110 stores a list linking a start notice received at the communication unit 102 and the state of unanswered PTT communication relating to that start notice (hereinafter, sometimes called a "missed call list") in the external data storage area AR1 of the storage unit 108. In a case where no participation instruction has been input at the key input unit 103 in a predetermined time after the start notice of PTT communication was received at the communication unit 102, the state of the unanswered PTT communication relating to this start notice is registered in the missed call list as "in progress (first state)".

When the start notice of a new unanswered PTT communication is registered in the missed call list, the control unit 110 stores the information relating to this PTT communication as a "missed call history" in the application area AR2. The missed call history includes, for example, information concerning the sponsor terminal and participant terminals (names, telephone numbers, e-mail addresses, etc.) and information of the date and time when the start notice was transmitted (or received).

After registering the missed call list and storing the missed call history, the control unit 110 ends the PTT application. When ending the PTT application, the control unit 110 starts another application program, for example, an application program for displaying a standby screen.

After that, where an end notice of PTT communication is received at the communication unit 102, the control unit 110 changes the state in the missed call list of unanswered PTT communication relating to the end notice from "in progress (first state)" to "end (second state)".

The control unit 110 performs this change of the missed call list according to, for example, the PTT application. Accordingly, in a case where the application has not been started up at the time when the end notice is received, the control unit 110 automatically starts up the PTT application, changes the missed call list in the PTT application, and automatically ends the PTT application after this change.

At the time when the PTT application is not started up (for example a time when a standby application is being executed), the control unit 110 displays a report indicating that the start notice of the PTT communication has been received, but the start notice has not been answered (hereinafter sometimes called as a "missed call report") on the display unit 107 based on the data stored in the external data storage area AR1.

Further, in this case, during a period until the end notice of the unanswered PTT communication is received at the communication unit 102, the control unit 110 displays on the display unit 107 that this unanswered PTT communication is in progress. For example, the control unit 110 displays a message such as "there is PTT communication in progress" on the standby screen of the display unit 107.

When there are a plurality of unanswered PTT communications, if PTT communications for which no end notice has yet been received are included in the plurality of PTT communications, the control unit 110 displays that the fact that there are unanswered PTT communication in progress on the standby screen of the display unit 107.

For example, where even one PTT communication in the state of "in progress" is registered in the missed call list of the external data storage area AR1, the control unit 110 displays "There is PTT communication in progress" or another message on the standby screen of the display unit 107.

At the time when displaying on the display unit 107 that there is unanswered PTT communication in progress ("There is PTT communication in progress"), if the end notice of that PTT communication in progress is received at the communication unit 102, the control unit 110 displays that the PTT communication ends in the display unit 107.

For example, the control unit 110 changes the missed call list in accordance with the reception of the end notice. When all of the states of unanswered PTT communications registered in the list become "end" by this change, the control unit 110 changes the message "There is PTT communication in progress" to a message such as "There is an incoming call of PTT". Due to this, it is reported that the PTT communication has already ended although unanswered PTT communication exists.

Further, the control unit 110 may display the number of PTT communications in the state of "in progress" in the missed call list, the number of PTT communications in the state of "end", or the number of PTT communications in either state of these, etc. on the standby screen of the display unit 107 as the missed call report.

At the time when the missed call report is displayed as described above, if an instruction for participating in the PTT communication relating to that missed call report in the middle is input to the key input unit 103, the control unit 110 changes or stops the display of the missed call report.

For example, when displaying "There is PTT communication" or another missed call report on the screen of the display unit 107, the control unit 110 displays a button representing a specific key of the key input unit 103 ("OK" button etc. on a standby screen L6 of FIG. 8) on the same screen as this. At the time when this screen is displayed, if the above-described specific key is depressed by the user, the control unit 110 starts the PTT application and controls the communication unit 102 to participate in the PTT communication corresponding to this missed call report in the middle. Namely, based on the information included in the start notice of this PTT communication, the communication unit 102 accesses the site for the communication management established by the communication management device 200, and performs the log-in processing to this site.

Further, for example, if a predetermined key (menu key) of the key input unit 103 is depressed when displaying the standby screen, the control unit 110 displays a menu screen for selecting various functions on the display unit 107. If the key input unit 103 is operated to select the PTT application from this menu screen, the control unit 110 starts the PTT application, and displays the menu screen for selection of further detailed functions concerning the PTT communication in the display unit 107. If the key input unit 103 is operated to participate in the unanswered PTT communication in the middle on this menu screen, the control unit 110 controls the communication unit 102 to participate midway in the PTT communication corresponding to the missed call report.

When participating in the PTT communication relating to the missed call report in the middle according to the operation as described above, the control unit 110 deletes the registered information concerning this PTT information from the missed call list. Namely, the user has already recognized the existence of the PTT communication in which it has participated midway, so the missed call report concerning this is not performed.

Note that in a case where the communication apparatus tries to participate midway in the PTT communication which relates to the missed call report being displayed in response to the instruction of midway participation input from the key input unit 103, but the PTT communication cannot be started, since the communication condition of the communication unit 102 is poor. Then, the control unit 110 displays that the PTT communication cannot be started due to poor communication (a message, for example, "PTT communication cannot be started since you are out of communication zone") on the display unit 107.

Further, for example, when the reception of the end notice from the communication management device 200 is delayed due to poor communication or the like, actual communication sometimes has already ended although that it is displayed as in progress on the standby screen of the display unit 107. For this reason, the communication apparatus may try to participated midway in the PTT communication in response to the missed call report, but the communication apparatus will not be able to start the communication, since that communication has already ended. In such a case, the control unit 110 stops the display of the missed call report indicating that the PTT communication is in progress.

When the communication apparatus fails to participate midway in the PTT communication as described above, it can be judged that the user has already recognized the existence of the PTT communication at the point of time when the instruction of the midway participation is input to the key input unit 103. In this case, it is not necessary to display the missed call report concerning the PTT communication again, therefore the control unit 110 may delete the registered information thereof from the missed call list.

On the other hand, the control unit 110 changes or stops the missed call report, also in a case where an instruction for displaying the missed call history relating to the missed call report on the display unit 107 is input to the key input unit 103 at the time when the missed call report as described above is displayed.

For example, when displaying a missed call report such as "There is a PTT incoming call" on the screen of the display unit 107, the control unit 110 displays a button representing a specific key of the key input unit 103 ("OK" button etc. on the standby screen L6 of FIG. 8) on the same screen as this. If the specific key is depressed by the user at the time when this screen is displayed, the control unit 110 starts the PTT application and automatically displays the screen of the missed call history in the started up PTT application.

Further, for example, if a predetermined key (menu key) of the key input unit 103 is depressed when displaying the standby screen, the control unit 110 displays the menu screen for selection of various functions in the display unit 107. If the key input unit 103 is operated to select the PTT application from this menu screen, the control unit 110 starts the PTT application, and displays the menu screen for selection of further detailed functions concerning the PTT communication on the display unit 107. If the key input unit 103 is operated to display the missed call history on this menu screen, the control unit 110 reads out the missed call history from the application area AR2 and displays this on the display unit 107.

When starting the PTT application by the method as described above and displaying the missed call history, the control unit 110 deletes the registered information concerning the PTT communication for which the history was displayed from the missed call list.

The control unit 110 explained above has, for example, a group communication control unit 111 and a report control unit 112 as blocks relating to the PTT communication.

The group communication control unit 111 is a block for performing the processing relating to the group communication, and performs the processing relating to, for example, the start or end of the PTT communication. Namely, when a start notice of PTT communication is received at the communication unit 102, and an instruction of participation in the PTT communication is received from the key input unit 103 in the predetermined time, the PTT communication is carried out by the communication unit 102.

The report control unit 112 performs the processing relating to the report of the missed call of PTT. Namely, when a start notice of PTT communication is received at the communication unit 102, the report control unit reports the reception of the start notice (that is occurrence of the incoming call of PTT) by the display unit 107 or speaker 105. Then, when no instruction of participation in the PTT communication is input from the key input unit 103 in the predetermined time, it is displayed on the display unit 107 that the PTT communication is in progress during the period until the end notice of PTT communication is received at the communication unit 102.

Here, the operation of the communication apparatus having the configuration explained above will be explained with reference to the flow charts of FIG. 3 to FIG. 7.

Figure 3:
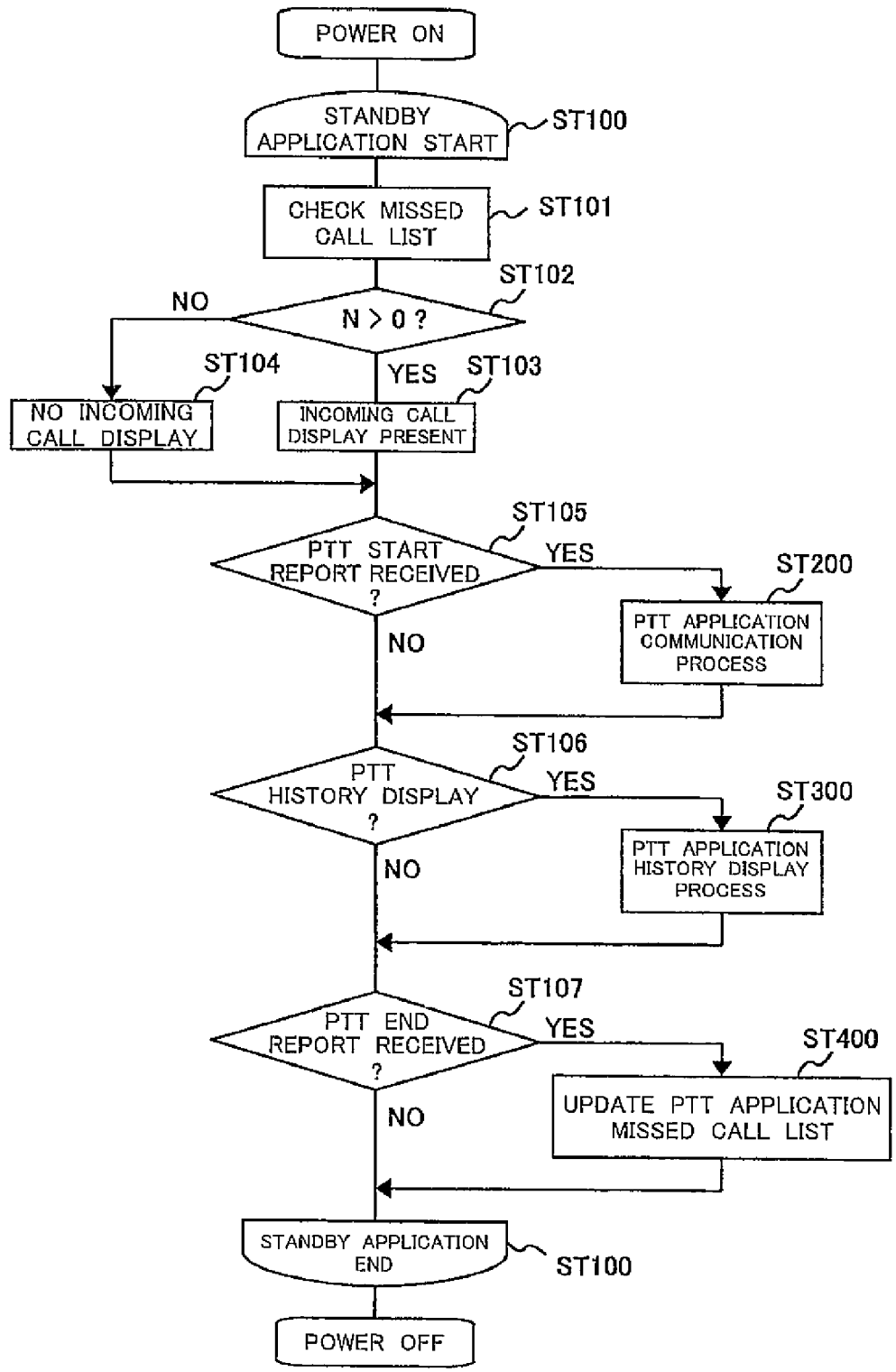
FIG. 3 A flow chart showing an example of an operation of starting up a PTT application from a standby state.

FIG. 3 is a flow chart showing an example of the operation of starting up the PTT application from the standby state.

When the power of the communication apparatus is turned on, the control unit 110 starts the standby application (step ST100).

In the started standby application, the control unit 110 checks the missed call list stored in the external data storage area AR1 (step ST101). When a number N of unanswered PTT communications registered in the missed call list is larger than zero (that is, a case where unanswered PTT communications are registered in the missed call list), the control unit 110 displays the missed call report on the standby screen of the display unit 107 (step ST103, FIG. 7).

On the other hand, in a case where the number N of unanswered PTT communications registered in the missed call list is zero (that is, a case where no unanswered PTT communication is registered in the missed call list), the control unit 110 does not display the missed call report (step ST104).

Figure 4:
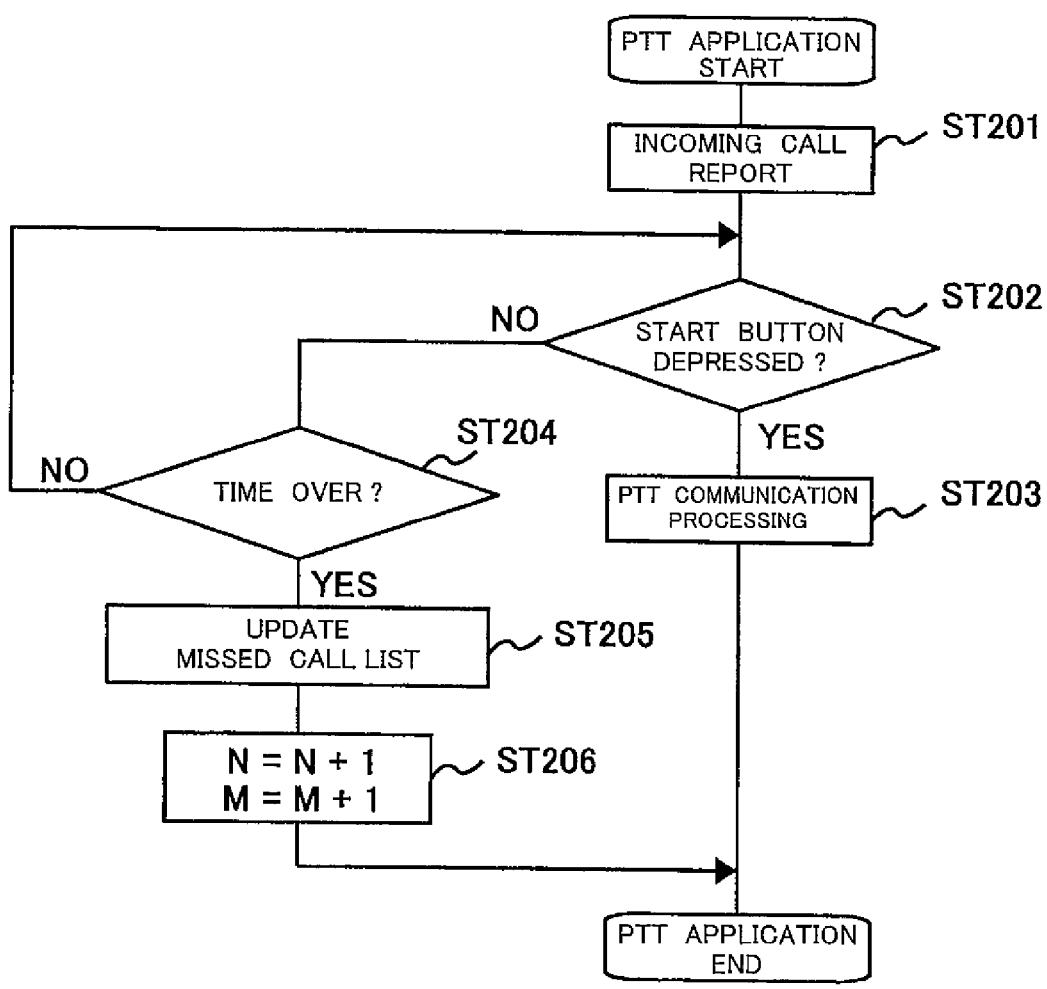
FIG. 4 A flow chart showing an example of communication processing of the PTT application.

When a start notice of PTT communication is received at the communication unit 102 at the time of standby (step ST105), the control unit 110 sets the standby application to the suspend state, starts up the PTT application, and performs the processing relating to the communication of PTT (step ST200, FIG. 4).

Figure 5:
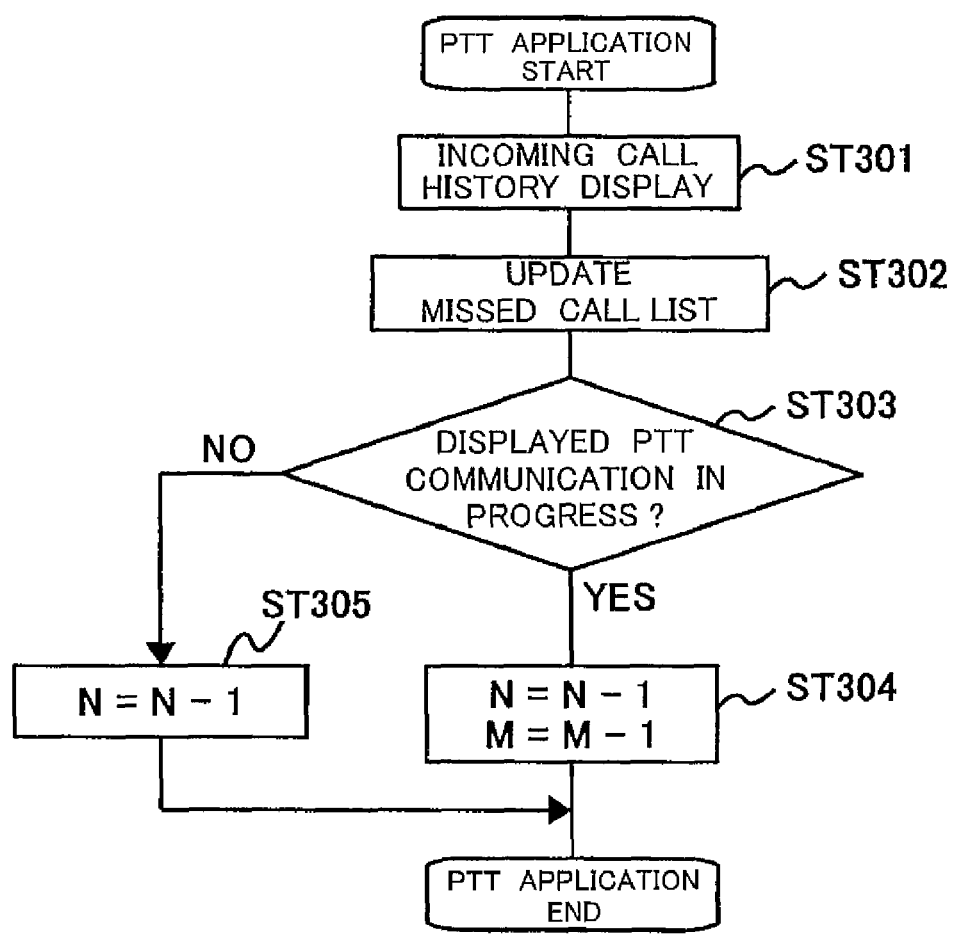
FIG. 5 A flow chart showing an example of display processing of a PTT incoming call history.

Further, if an operation for displaying the incoming call history of PTT is carried out at the key input unit 102 at the time of standby (step ST106), the control unit 110 sets the standby application in the suspend state, starts up the PTT application, and performs the processing relating to the display of the incoming call history (step ST300, FIG. 5).

Figure 6:
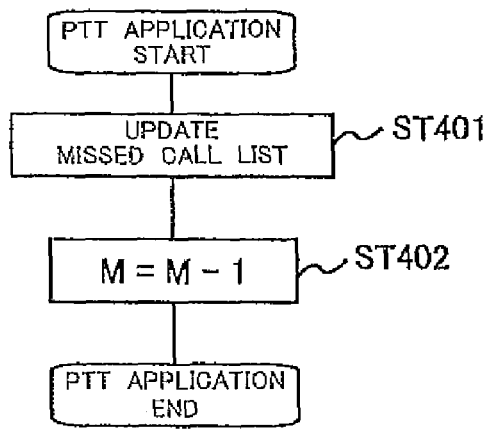
FIG. 6 A diagram showing an example of updating processing of a missed call list.

Further, if an end notice of PTT communication is received at the communication unit 102 at the time of standby (step ST107), the control unit 110 sets the standby application in the suspend state, starts up the PTT application, and performs the processing relating to the updating of the missed call list (step ST400, FIG. 6).

FIG. 4 is a flow chart showing an example of the communication processing of the PTT application at step ST200 of FIG. 3.

If a start notice of PTT communication is received at the communication unit 102, the control unit 110 starts up the PTT application, and runs a report operation of the PTT incoming call according to the PTT application (step ST201). The control unit reports that a start notice of PTT communication has been received by, for example, displaying a message informing the incoming call of PTT on the screen of the display unit 107 or making the speaker 105 generate a sound.

Then, the control unit 110 monitors whether a predetermined key (start button of the PTT communication) provided in the key input unit 103 was depressed (step ST202). When the start button is depressed in a predetermined time, the control unit 110 performs the PTT communication processing by the communication unit 102. Namely, the control unit 110 transmits a response indicating participation in the PTT communication with respect to the received start notice to the communication management device 200, and starts the PTT communication.

On the other hand, when the start button is not depressed in the predetermined time, the control unit 110 judges that no participation instruction with respect to the PTT communication has been input (step ST204) and registers the information concerning this unanswered PTT communication in the missed call list (step ST205). In this case, the control unit 110 sets the state of the PTT communication to be newly registered as "in progress".

Further, the control unit 110 increments the number N of unanswered PTT communications registered in the missed call list by exactly "1" and increments the number M of unanswered PTT communications in the state of "in progress" by exactly "1" (step ST206).

FIG. 5 is a flow chart showing an example of the display processing of the PTT incoming call history at step ST300 of FIG. 3.

When an instruction for displaying the incoming call history of PTT is input at the key input unit 103, the control unit 110 starts up the PTT application, and displays the information of the incoming call history (including the missed call history) stored in the application area AR2 on the screen of the display unit 107 according to the PTT application (step ST301). This screen is divided into, for example, a screen schematically displaying the information (sponsor name and date etc.) of the PTT communication relating to the received start notice in a list format and a screen displaying detailed information (sponsor names, dates, participant names, etc.) of PTT communications as shown in, for example, screens L3 and L4 of FIG. 8.

When the information of unanswered PTT communication in the state of "in progress" is displayed on the screen of the incoming call history, the control unit 110 deletes the registered information concerning this PTT communication from the missed call list, and decrements each of the number N of unanswered PTT communications registered in the missed call list and the number M of unanswered PTT communications in the state of "in progress" by "1".

On the other hand, when the information of unanswered PTT communication in the state of "end" is displayed on the screen of the incoming call history, the control unit 110 deletes the registered information concerning this PTT communication from the missed call list and decrements the number N of unanswered PTT communications registered in the missed call list by exactly "1".

FIG. 6 is a diagram showing an example of the updating processing of the missed call list in step ST400 of FIG. 3.

When an end notice of PTT communication is received, the control unit 110 starts up the PTT application, retrieves the registered information of the PTT communication relating to the end notice registered in the missed call list, and changes the state of the PTT communication in the retrieved registered information from "in progress" to "end" (step ST401). Further, the control unit decrements the number M of unanswered PTT communications in the state of "in progress" in the missed call list by exactly "1".

Figure 7:
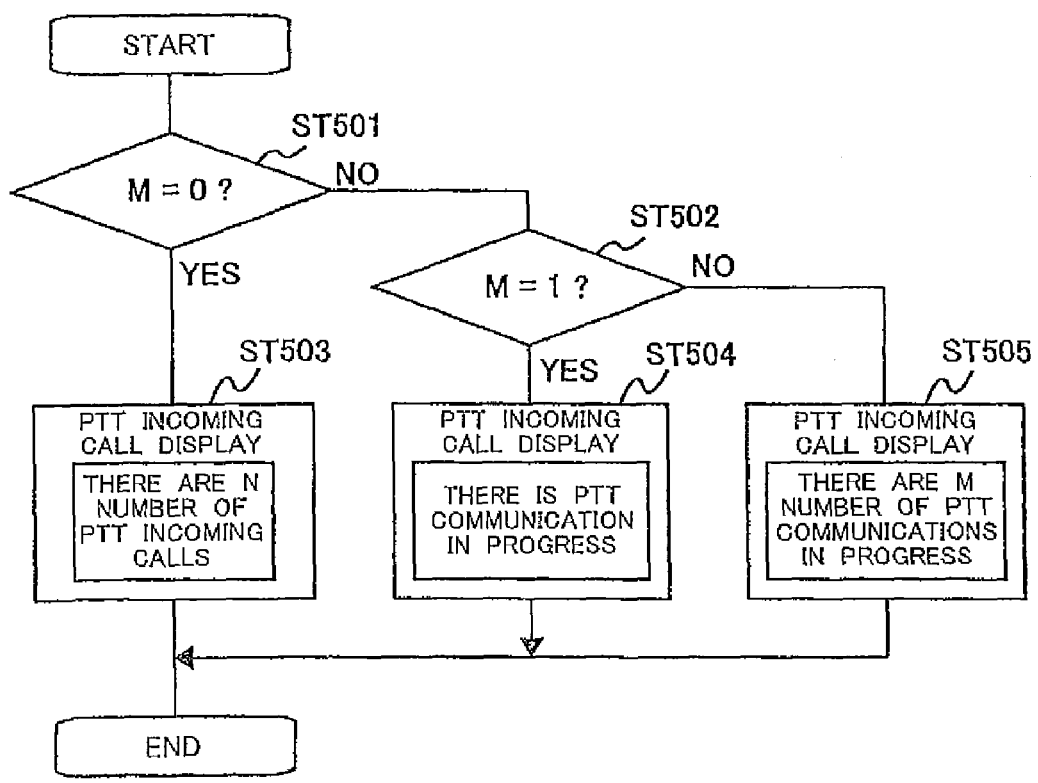
FIG. 7 A diagram showing an example of display processing of a missed call report.

FIG. 7 is a diagram showing an example of the display processing of the missed call report in step ST103 of FIG. 3.

When the number N of unanswered PTT communications registered in the missed call list is larger than zero and the number M of unanswered PTT communications in the state of "in progress" in the missed call list is zero (step ST503), the control unit 110 displays that there is an incoming call of the PTT communication which is not in progress (that is, has ended) on the screen of the display unit 107 (step. ST503). For example, the control unit 110 displays "There are N number of PTT incoming calls" or another message on the display unit 107.

When the number N of unanswered PTT communications registered in the missed call list is larger than zero and the number M of unanswered PTT communications in the state of "in progress" in the missed call list is "1" (step ST502), the control unit 110 displays that there is (one) incoming call of the PTT communication in progress on the screen of the display unit 107 (step ST504). For example, the control unit displays "There is PTT communication in progress" or another message on the display unit 107.

Where the number N of unanswered PTT communications registered in the missed call list is larger than zero and the number M of unanswered PTT communications in the state of "in progress" in the missed call list is larger than "1" (step ST502), the control unit 110 displays that there are M number of PTT communications in progress on the screen of the display unit 107 (step ST505). For example, the control unit 110 displays "there are M number of PTT communications in progress" or another message on the display unit 107.

Next, an example of the screen transition in the display unit 107 will be explained with reference to FIG. 8 and FIG. 9.

Figure 8:
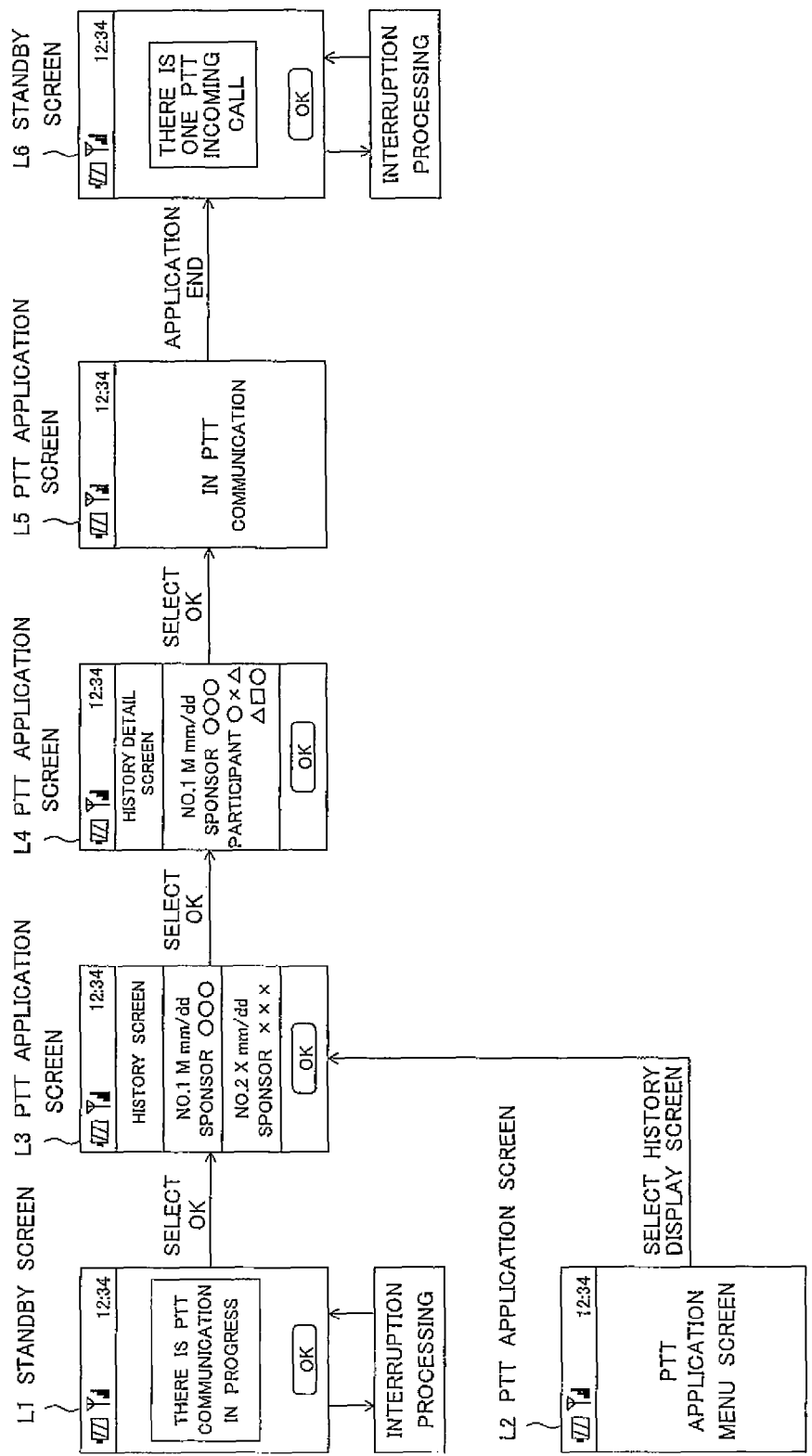
FIG. 8 A diagram showing an example of screen transition of a display unit along with display processing of the incoming call history.

FIG. 8 is a diagram showing an example of the screen transition of the display unit 107 along with the display processing of the incoming call history.

For example, assume that one PTT communication in the state of "in progress" and one PTT communication in the state of "end" are registered in the missed call list of the storage unit 108. In this case, the control unit 110 displays a message such as "There is PTT communication in progress" on the standby screen L1. The missed call report of the standby screen L1 is continuously displayed without being erased even if an interruption processing according to another application program which is not the PTT application occurs.

On this screen L1, when a predetermined key (execute key etc.) of the key input unit 103 corresponding to the "OK" button displayed on the lower side of the missed call report is depressed, the control unit 110 starts the PTT application, reads out the information of the incoming call history stored in the application area AR2, composes the screen L3 of the incoming call history based on this information, and displays this on the display unit 107.

Further, even in a case where tan instruction is input from the key input unit 103 to display the incoming call history of the PTT application on another menu screen L2, the control unit 110 composes the screen L3 of the incoming call history and displays this on the display unit 107 in the same way as the former.

On the screen L3 of the incoming call history, rough information of the PTT communication, relating to the start notice which has been received hitherto, is displayed in a list format. On this screen L3, if one item is selected by the direction key etc. from among the plurality of PTT communication items and the predetermined key corresponding to the "OK" button is depressed, the control unit 110 composes the screen L4 including further detailed information concerning this PTT communication and displays this on the display unit 107.

At this time, when the PTT communication displayed on the screen L4 is unanswered PTT communication registered in the missed call list, the control unit 110 deletes the registered information concerning this PTT communication from the missed call list.

If the predetermined key corresponding to the "OK" button is depressed on the screen L4, the control unit 110 executes the processing for midway participation in this unanswered PTT communication (screen L5).

If the midway participation in the PTT communication ends and the standby application is returned to, since only one PTT communication in the "end" state is registered in the missed call list, the control unit 110 displays the message such as "There is one PTT incoming call" on the standby screen L6.

Figure 9:
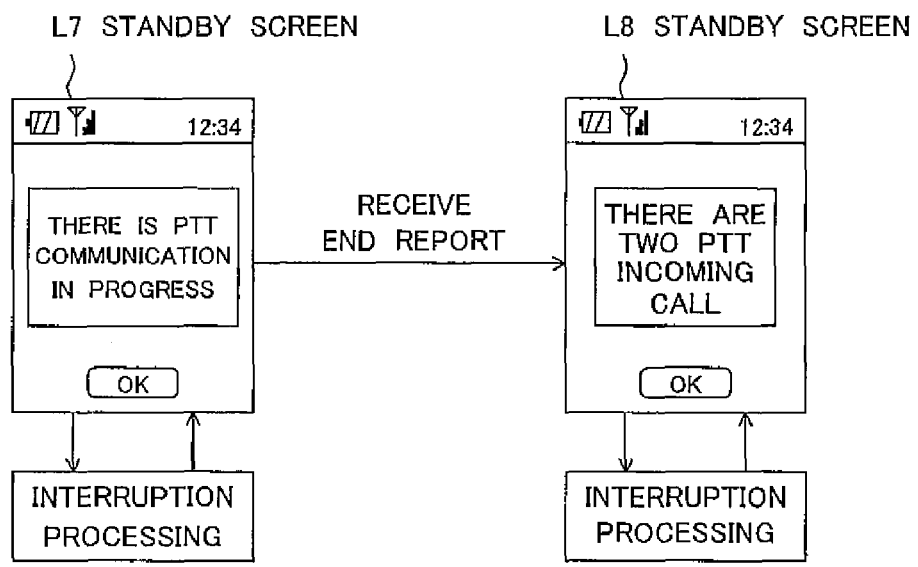
FIG. 9 A diagram showing an example of the screen transition along with the reception of an end notice of the PTT communication.

FIG. 9 is a diagram showing an example of the screen transition along with the reception of the end notice of the PTT communication.

In the same way as the example of FIG. 8, if assuming that one PTT communication in the state of "in progress" and one PTT communication in the state of "end" are registered in the missed call list, the control unit 110 displays a message such as "There is PTT communication in progress" on the standby screen L7.

At this time, in the communication unit 102, if the end notice of PTT communication in the state of this "in progress" is received, the control unit 110 changes the state of the PTT communication in the missed call list from the state of "in progress" to the state of "end". For this reason, on the standby screen L8 after the list change, a message such as "there are two PTT incoming calls" is displayed. By this display, it is shown that the PTT communication in progress is not included in unanswered PTT communications.

As explained above, according to the present embodiment, where the start notice of the PTT communication is received at the communication unit 102, the operation of reporting the reception of this start notice (the display of the message in the display unit 107 etc.) is carried out. When no instruction to participate in the PTT communication is input from the key input unit 103 with respect to this report operation, during the period until the end notice of PTT communication is received at the communication unit 102, it is displayed on the display unit 107 that the PTT communication is in progress. Due to this, it can be accurately grasped that there is unanswered PTT communication for which a start notice has been received, but for which no response has been returned, and it can be easily confirmed that the PTT communication is in progress.

Further, when displaying the fact that unanswered PTT communication relating to a start notice received at the communication unit 102 is in progress on the display unit 107, and if the communication unit 102 receives the end notice of the PTT communication, then, the end of the PTT communication is displayed on the display unit 107. Therefore it can be easily confirmed that unanswered PTT communication has already ended.

In addition, when it is displayed on the display unit 107 that unanswered PTT communication is in progress, by inputting an instruction for midway participation in the PTT communication at the key input unit 103, the communication apparatus can easily midway participate in PTT communication which is assured to be in progress.

Further, when there are a plurality of unanswered PTT communications, if a PTT which has not yet received an end notice is included in those, it is displayed on the display unit 107 that there is PTT communication which has not been answered and is in progress. Therefore, even in a case where an incoming call of PTT frequently occurs, unanswered PTT communication and its communication condition can be correctly grasped.

An embodiment of the present invention was explained up to here, but the present invention is not limited to only the above embodiment. Various modifications are possible.

In the embodiment explained above, where unanswered PTT communication occurs, that PTT is handled as if it were in the state of being in progress until the end notice is received, but the present invention is not limited to this. For example, in a case where the end notice of unanswered PTT communication is not received for a certain time or longer, it may be judged that the PTT communication changed from the state of being in progress to the end state as well.

Namely, when the end notice of PTT communication has not been received at the communication unit 102 for a predetermined time or more from when the display unit 107 begins to display that there is PTT communication which has not been answered and is in progress, the control unit 110 may stop the display of the display unit 107 indicating that the PTT communication is in progress.

Due to this, in a case where the end notice does not arrive due to an accident such as, for example, poor communication, it can be effectively avoided that unanswered PTT communication be displayed as in progress for a long time.

Further, in the flow chart of FIG. 7, when there is PTT communication which has not been answered and is in progress, the number M thereof is displayed in the missed call report, while when there is no PTT which has not been answered and is in progress, the number N of unanswered PTT communications which have already ended is displayed in the missed call report, but the present invention is not limited to this example. For example, as shown in FIG. 10, both of the number of PTT communications which have not answered and is in progress and the number of unanswered PTT communications which have already ended may be displayed as well.

In FIG. 10A, two PTT communications in the "in progress" state and two PTT communications in the "end" state are registered in the missed call list. Therefore, in the missed call report, these are displayed as "In progress: 2; End: 2).

In the state of this FIG. 10A, if the end notice of PTT communication relating to "Missed call 4" is received, as shown in FIG. 10B, the state of this PTT communication in the missed call list is changed from "in progress" to "end". For this reason, in the missed call report, these are displayed as "In progress: 1; End: 3".

Further, in the state of FIG. 10B, if the incoming call history of "Missed call 4" is confirmed by the operation of the user, as shown in FIG. 10C, the registered information concerning this PTT communication is deleted from the missed call list. For this reason, in the missed call report, these are displayed as "In progress: 0; End: 3".

In this way, when the number of PTT communications is displayed for each state of the PTT communication, the state of unanswered PTT communication can be more correctly grasped.

In the embodiment explained above, the report of the missed call is mainly performed by the screen display of the display unit 107, but the present invention is not limited to this. For example, the missed call may be reported as well by sound generated at the speaker 105, vibration generated by a not shown vibration unit, light generated by a not shown light emitting unit or the like.

In the embodiment explained above, PTT was mentioned as an example of the group communication, but the present invention is not limited to this and can be applied to other various group communications as well.

Functions of components of the communication apparatus explained above may be all realized by software as well, or at least a portion thereof may be realized by hardware. For example, the processing in the control unit 110 and data processing in the communication unit 102 and audio processing unit 104 may be realized on a computer according to one or more programs or at least a portion thereof may be realized by hardware.

The invention claimed is:

1. A communication apparatus comprises:
    a communication unit configured to perform group communication;
    an input unit configured to input an instruction,
    a report unit; and
    a control unit configured to make the communication unit perform the group communication if the communication unit receives a start notice of group communication and an instruction of participation in the group communication is input from the input unit, wherein;
    when the communication unit receives the start notice of group communication, the control unit makes the report unit report the reception of the start notice and,
    when a participation instruction is not input from the input unit with respect to the report, the control unit makes the report unit report that the group communication is in progress until the group communication ends.

2. A communication apparatus as set forth in claim 1, wherein;
    the control unit judges that the group communication relating to an end notice has ended based on the communication unit receiving an end notice of group communication.

3. A communication apparatus as set forth in claim 2, wherein;
    when the report unit is reporting that group communication relating to the start notice is in progress, the control unit makes the report unit report the end of the group communication if the communication unit receives the end notice of the group communication.

4. A communication apparatus as set forth in claim 2, wherein;
    if the end notice of the group communication has not been received for a predetermined time or more from when making the report unit report that the group communication relating to the start notice is in progress, the control unit stops the reporting by the report unit which shows that the group communication is in progress.

5. A communication apparatus as set forth in claim 2, wherein;
    the communication apparatus further comprises a storage unit configured to store a list linking the start notices received by the communication unit and the states of the group communications corresponding to the start notices, and
    the control unit registers the state of the group communication corresponding to the received start notice in the list as a first state when no participation instruction is input at the input unit in a predetermined time from when the communication unit received the start notice, changes the state of the group communication corresponding to an end notice in the list to a second state and if the communication unit receives an end notice of the group communication, and makes the report unit report that the group communication in progress is included in group communications corresponding to start notices when at least one group communication in the first state is registered in the list.

6. A communication apparatus as set forth in claim 5, wherein;
    the control unit makes the report unit report that ended group communication is included among the group communications corresponding to the start notice if at least one group communication in the second state is registered in the list.

7. A communication apparatus as set forth in claim 5, wherein;
    the control unit makes the report unit report at least one of a number of group communications in the first state included in the list and a number of group communications in the second state included in the list.

8. A communication apparatus as set forth in claim 1, wherein;
when no participation instruction is input in a predetermined time from when the report unit reported the reception of the start notice, the control unit makes the report unit report, in place of the report of the reception of the start notice, a report indicating that the participation instruction has not been input although the communication apparatus has received the start notice.

9. A communication apparatus as set forth in claim 1, wherein;
when the report unit is reporting that the group communication relating to the start notice is in progress, the control unit makes the communication unit engage in the group communication if an instruction of midway participation in the group communication is input from the input unit.

10. A communication apparatus as set forth in claim 9, wherein;
when trying to start group communication in response to a midway participation instruction with respect to group communication being reported by the report unit and the group communication cannot be started since the communication condition of the communication unit is poor, the control unit makes the report unit report that the group communication cannot be started due to a poor communication condition.

11. A communication apparatus as set forth in claim 9, wherein;
when trying to start group communication in response to a midway participation instruction with respect to group communication being reported by the report unit and the group communication cannot be started since the group communication has already ended, the control unit makes the report unit stop the reporting which shows that the group communication is in progress.

12. A communication apparatus as set forth in claim 1, wherein;
the control unit makes the report unit report that there are group communications in progress for which participation instructions have not been input though the reception of start notices have been generated, if there is a plurality of group communications to which participation instructions from the input unit have not been input though the reception of start notices have been generated, and the plurality of group communications include group communications which have not yet ended.

13. A server apparatus engaging in communication with a plurality of communication apparatuses including a communication apparatus as set forth in claim 1 and managing the group communication,
which server apparatus transmits a start notice of group communication to a communication apparatus designated as another party when the other party is designated from one of the communication apparatuses and the start of group communication is requested, allows the communication apparatus which has requested the start and a communication apparatus which has answered engage in group communication therebetween if there is a response of participation from any communication apparatus which has transmitted a start notice, and transmits an end notice with respect to the communication apparatus of the designated other party when the group communication in progress is to be ended.

14. A communication apparatus comprises:
a communicating means configured to engage in group communication;
an inputting means configured to input an instruction;
a reporting means;
a group communication controlling means configured to make the communication unit engage in group communication if the communication unit has received a start notice of group communication and received as input an instruction of participation in group communication from the input unit in a predetermined time; and
a report controlling means configured to make said report unit report the reception of the start notice when said communication unit has received the start notice of the group communication, and make the report unit report that the group communication is in progress during a period until the communication unit receives the end notice of the group communication when no participation instruction is input from the input unit in a predetermined time from the reception.

15. A communication control method operating in a communication apparatus comprising a communication unit, an instruction input unit, and a report unit and engaging in group communication by the communication unit if an instruction of participation in group communication is input from the instruction input unit when the communication unit receives a start notice of group communication,
the communication control method including the steps of:
reporting by the report unit the reception of a start notice when a start notice of group communication is received; and
reporting by the report unit that group communication is in progress during a period until the communication unit receives an end notice of group communication when no participation instruction is input from the input unit with respect to the report.

* * * * *